(12) United States Patent
Kegel et al.

(10) Patent No.: US 12,182,412 B2
(45) Date of Patent: *Dec. 31, 2024

(54) SETTING DURATIONS FOR WHICH DATA IS STORED IN A NON-VOLATILE MEMORY BASED ON DATA TYPES

(71) Applicant: Advanced Micro Devices, Inc., Santa Clara, CA (US)

(72) Inventors: Andrew G. Kegel, Redmond, WA (US); Steven E. Raasch, Boston, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,461

(22) Filed: Jul. 6, 2021

(65) Prior Publication Data

US 2021/0334012 A1 Oct. 28, 2021

Related U.S. Application Data

(63) Continuation of application No. 16/525,971, filed on Jul. 30, 2019, now Pat. No. 11,061,583.

(51) Int. Cl.
G06F 3/06 (2006.01)
G06F 12/0891 (2016.01)
G06F 16/907 (2019.01)

(52) U.S. Cl.
CPC .......... *G06F 3/0616* (2013.01); *G06F 3/0658* (2013.01); *G06F 3/0679* (2013.01); *G06F 12/0891* (2013.01); *G06F 16/907* (2019.01)

(58) Field of Classification Search
None
See application file for complete search history.

(56) References Cited

U.S. PATENT DOCUMENTS

| | | | |
|---|---|---|---|
| 8,120,969 B1* | 2/2012 | Montierth | G11C 16/3431 365/185.11 |
| 2013/0073785 A1* | 3/2013 | Emma | G06F 12/0223 711/E12.008 |
| 2015/0293845 A1* | 10/2015 | Hsu | G06F 12/0811 711/122 |
| 2016/0253265 A1* | 9/2016 | Rapoport | G06F 3/0604 711/135 |

* cited by examiner

*Primary Examiner* — Kevin Verbrugge
(74) *Attorney, Agent, or Firm* — FIG. 1 Patents

(57) ABSTRACT

An electronic device includes a non-volatile memory and a memory controller. The memory controller selects, from the type-duration table, a duration for which data of a type of data is to be stored in a non-volatile memory. The memory controller writes the data to the non-volatile memory using values of one or more write parameters selected by the memory controller based on the duration. The memory controller sets an expected lifetime value in a record for the data in the expected lifetime table to indicate an expected lifetime of the data in the non-volatile memory.

20 Claims, 3 Drawing Sheets

SETTING DURATIONS FOR WHICH DATA IS STORED IN A NON-VOLATILE MEMORY BASED ON DATA TYPES

RELATED APPLICATIONS

This application is a continuation of, and hereby claims priority to, pending U.S. patent application Ser. No. 16/525,971, which was filed on 30 Jul. 2019 and which is incorporated by reference herein.

BACKGROUND

Related Art

Some electronic devices store data in memory circuits in non-volatile memories such as flash memories, phase change memories, etc. While non-volatile memories are known for retaining stored data after electrical power is removed from the non-volatile memories, in most non-volatile memories, stored data gradually degrades or decays. That is, memory circuits in many non-volatile memories lose electrical charge or otherwise experience reductions in memory-retention values (e.g., resistance, etc.) over time, leading to degradation or decay of the data that is stored in the memory circuits. Given a sufficiently long period of time, data stored in non-volatile memories degrades or decays to the point of unreliability—i.e., where reads of the data are not certain to return an initially-written value of the data. In order to ensure that data is reliably stored in non-volatile memories, therefore, designers have configured writes of data for non-volatile memories so that data stored in the non-volatile memories is retained for longer periods of time. For example, for flash memories, data is written to memory circuits using relatively high write voltages that are sustained for relatively long times to ensure that memory circuits are adequately charged to retain stored data for durations that extend to a decade or more. In some cases, due to the caution of the designers, the duration for which data is reliably stored in non-volatile memories is far longer than the time for which data is useful, which can reduce the performance of the non-volatile memories. For example, in some electronic devices, non-volatile memories are used for storing temporary data or data of limited contextual scope, i.e., data that is used for a limited time after being stored in non-volatile memories and may thereafter be unused. In such cases, the effort and energy expended on writing the data to the non-volatile memories, e.g., the relatively high write voltages and relatively long write times in flash memories, is wasted—and may shorten the lifetime of the non-volatile memories due to heat and wear effects.

BRIEF DESCRIPTION OF THE FIGURES

Throughout the figures and the description, like reference numerals refer to the same figure elements.

DETAILED DESCRIPTION

Figure 1:
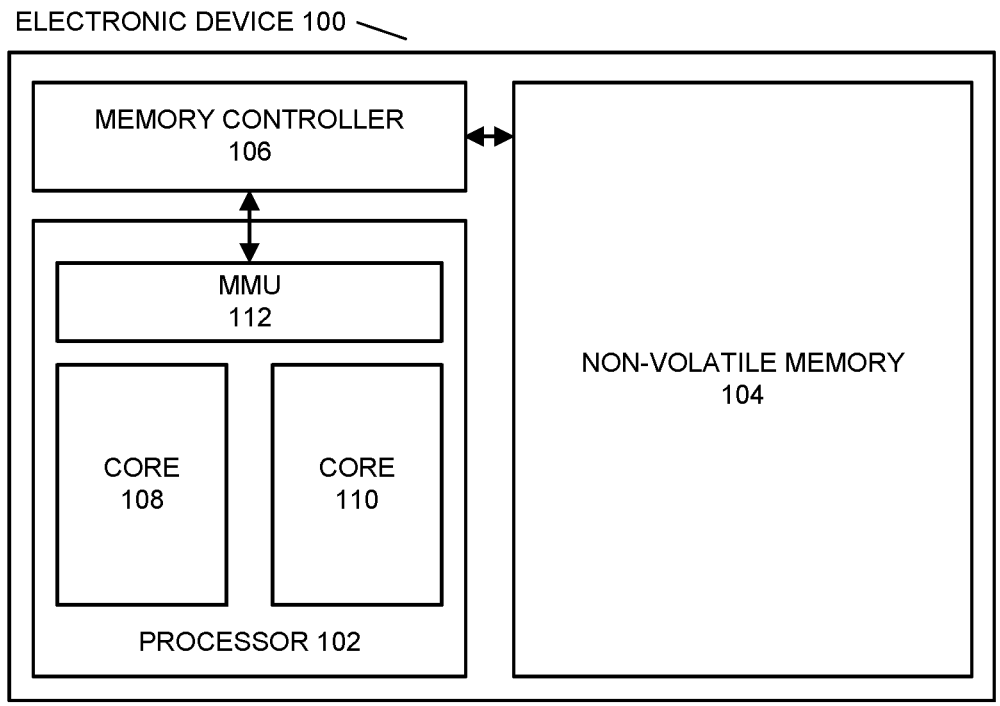
FIG. 1 presents a block diagram illustrating an electronic device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of one of these terms. Note that this term may have significant additional aspects that are not recited herein for clarity and brevity and thus the description is not intended to limit the term.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element and/or a common clock, etc. A functional block can include any number of circuit elements, from a single circuit element (e.g., a single integrated circuit logic gate) to millions or billions of circuit elements (e.g., an integrated circuit memory).

Overview

Data written to some forms of non-volatile memories using typical write parameters (e.g., voltages, currents, times, etc.) can remain stored in the non-volatile memories for relatively long durations before degrading or decaying to the point where the data can no longer be reliably read from the non-volatile memories. For example, data written to a flash memory using typical write parameters can remain reliably stored in the flash memory for a decade or more. For some types of data, it is unnecessary to store the data in non-volatile memories for such long durations. For example, temporary data, data of limited contextual scope, and/or other data may only be used for a short time and may not be required for subsequent operations. In the described embodiments, a controller (e.g., a memory controller, a central processing unit, etc.) controls writes of different types of data in non-volatile memories in order to set the duration for which data of each type is reliably stored in the non-volatile memories. The controller generally sets shorter durations for types of data for which longer durations are not necessary and/or desirable, such as temporary data, data of limited contextual scope, etc., and sets longer durations for types of data for which longer durations are necessary and/or desirable, such as user or system files, program code, etc.

In the described embodiments, for types of data for which longer durations of storage in non-volatile memories are not necessary and/or desirable, and thus shorter durations can be used, the controller more "weakly" writes data in memory circuits in the non-volatile memories. For more weakly writing data in non-volatile memories, the controller adjusts write parameters for write operations (e.g., currents, voltages, times, etc.) so that the memory circuits of the non-volatile memories are less fully electrically charged and/or are otherwise more weakly set to store the data. In contrast, in order to ensure longer duration storage for types of data for which longer durations of storage in non-volatile memories are necessary and/or desirable, the controller more "strongly" writes the data in memory circuits in the non-volatile memories. For more strongly writing data in non-volatile memories, the controller adjusts write parameters for write operations so that the memory circuits of the non-volatile memories are more fully electrically charged and/or are otherwise more strongly set to store the data. A distinction between more weakly written data and more strongly written data is that more weakly written data will tend to degrade or decay to the point where the data is no longer reliably stored in the non-volatile memory sooner— and much sooner in some embodiments—than more strongly written data. More weakly written data therefore has a shorter duration of reliable storage in the non-volatile memories than more strongly written data. Although leading to shorter durations of reliable storage for data, more weakly writing data in non-volatile memories saves effort (e.g., electrical power, time, etc.) when compared to more strongly writing data.

In the described embodiments, in operation, upon receiving data (e.g., a single bit of data, a 64 or 128 B block of data, a 4 kB page of data or a portion thereof, etc.) to be stored in a non-volatile memory, the controller determines a type of the data. For example, in some embodiments, the controller determines the type of the data based on the data itself and/or metadata associated therewith, based on a source or a destination of the data, based on an indication of the type of the data received from another entity in the electronic device, etc. The controller then determines, based on the type of the data, a duration or lifetime for which the data is to be stored in the non-volatile memory. For example, in some embodiments, the controller determines the duration by performing a lookup in a type-duration table, computing the duration using a type-duration algorithm, etc. The controller next uses the duration for setting the values of one or more parameters for writing the data to the non-volatile memory. Generally, when longer duration storage is necessary and/or desirable, the controller sets the parameters so that the data is more strongly written to the non-volatile memory. On the other hand, when longer duration storage is not necessary and/or desired, the controller sets the parameters so that the data is more weakly written to the non-volatile memory. The particular parameters and settings thereof depend on the form of the non-volatile memory (i.e., of the specific memory circuits therein) and/or other factors, but can include parameters such as voltages, times, currents, clock frequencies, pulse durations or polarities, temperatures, and/or other values. After setting the parameters, the controller writes the data to the non-volatile memory using the values of the one or more parameters.

In some embodiments, the controller keeps records of expected lifetimes for instances of data stored in the non-volatile memory. Upon writing a given instance of data (e.g., a single bit of data, a 64 or 128 B block of data, a 4 kB page of data or a portion thereof, etc.) to the non-volatile memory as described above, the controller updates a record of expected lifetime associated with the given instance of data to reflect an expected lifetime of the data based on the form of the write. For example, when the data is more weakly written to the non-volatile memory, the controller may update the record to indicate a shorter expected lifetime for the data. The controller then uses record of expected lifetimes associated with data to determine how various subsequent operations are performed on, for, or with the data. In some of these embodiments, the record of expected lifetime is or includes a table in the controller and/or metadata in the non-volatile memory itself, such as bits in or associated with the memory circuits.

In some embodiments, the controller uses records of expected lifetimes for data for refreshing data in the non-volatile memory. Generally, in some embodiments, the controller selects a duration/lifetime for a given type of data that fits with an amount of time for which the given type of data is expected to remain stored in the non-volatile memory. Individual instances of the given type of are therefore expected to be removed from the non-volatile memory (e.g., deleted, invalidated, etc.) before the instances of the given type of data degrade or decay to the point of unreliability. It may happen, however, that some instances of types of data are retained in the non-volatile memory and remain useful for longer than the selected duration—and thus would become unreliable if nothing was done to refresh these instances of the types of data. The controller therefore monitors the records of expected lifetime and performs refreshes of the data based thereon. For this operation, in some embodiments, when the remainder of an expected lifetime for an instance of data is less than a threshold amount of time and the instance of data remains stored in the non-volatile memory, the controller refreshes the data in the non-volatile memory. For example, the controller may read and then rewrite the data in the non-volatile memory or may cause refreshing circuit elements to refresh the data in place in the non-volatile memory. In some of these embodiments, the controller uses a different duration than a prior duration for the data when refreshing of the data in the non-volatile memory. For example, the controller may automatically use a longer duration or a default duration when refreshing an instance of data that previously had a shorter duration.

By setting durations for data to be written to non-volatile memories based on types of the data and writing the data using corresponding write parameters, the described embodiments can reduce the amount of effort expended on writing data to the non-volatile memories while retaining reliable and useful data in the non-volatile memories for adequate durations. The reduction in effort for the writes helps to increase the efficiency of the non-volatile memories, which improves the overall performance of the electronic device. Improved performance for the electronic device improves user satisfaction with the electronic device.

Electronic Device

FIG. 1 presents a block diagram illustrating electronic device 100 in accordance with some embodiments. As can be seen in FIG. 1, electronic device 100 includes processor 102, non-volatile memory 104, and memory controller 106. Processor 102 is a functional block that performs computational and other operations in electronic device 100. Processor 102 includes two cores 108-110, each of which includes one or more functional blocks such as central processing unit (CPU) cores, graphics processing unit (GPU) cores, embedded processors, and/or application specific integrated circuits (ASICs). Processor 102 also includes memory management unit (MMU) 112, which is a functional block that performs operations associated with address translations (e.g., page table walks, translation lookaside buffer lookups, etc.), memory access protections, etc. for memory accesses by cores 108-110 and other entities in processor 102 (not shown).

Non-volatile memory 104 is a functional block that performs operations of a memory (e.g., a main memory) in electronic device 100. Non-volatile memory 104 includes memory circuits (i.e., storage elements, access elements, etc.) for storing data and instructions for use by functional blocks in electronic device 100, as well as control circuits for handling accesses (e.g., reads, writes, checks, deletes, invalidates, etc.) of data and instructions in the memory circuits. The memory circuits in non-volatile memory 104 include computer-readable non-volatile random access memory (NVRAM) circuits such as flash memory, phase change memory, ferroelectric random access memory, spin-transfer torque random access memory, magnetoresistive random access memory, and/or other types of non-volatile memory circuits, or a combination thereof.

The memory circuits in non-volatile memory 104 are "non-volatile" in the sense that the memory circuits retain data when electrical voltage, current, and/or power is reduced below a threshold level or removed from non-volatile memory 104. For example, in some embodiments, the memory circuits in non-volatile memory 104 retain data when electronic device is shut down and/or placed in a lower power operating mode. Although data is retained in the memory circuits, the data gradually degrades or decays. Given a sufficient amount of time, the data degrades or decays to the point of being unreliable—in that a read of the memory circuits after the amount of time has passed is not certain to return data that was previously written to the memory circuits. The particular effects by which data degrades or decays depend on the type of memory circuits in non-volatile memory 104. For example, in an embodiment in which the memory circuits in the non-volatile memory are flash memory circuits, the degradation or decay is caused by the dissipation of electrical charge from floating gate elements, which are the storage elements of flash memory. In view of the degradation or decay of data stored in memory circuits of non-volatile memories, the described embodiments select durations of storage for data to be written into non-volatile memory 104 based on types of the data as described herein.

Figure 2:
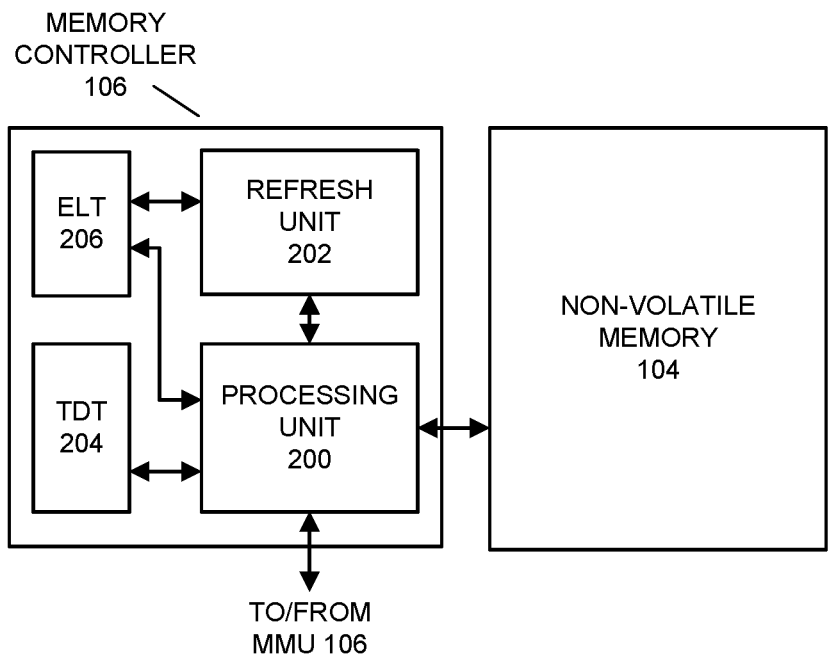
FIG. 2 presents a block diagram illustrating a memory controller in accordance with some embodiments.

Memory controller 106 is a functional block or device that handles accesses of the data that are stored in non-volatile memory 104 on behalf of processor 102 and possibly other functional blocks in electronic device 100 (not shown) and performs other control or configuration operations associated with non-volatile memory 104. FIG. 2 presents a block diagram illustrating memory controller 106 in accordance with some embodiments. As can be seen in FIG. 2, memory controller 106 includes processing unit 200, refresh unit 202, type-duration table (TDT) 204, and expected lifetime table (ELT) 206. Processing unit 200 is a functional block such as a microcontroller, a CPU core, an ASIC, etc. that performs operations of memory controller 106 such as handling memory accesses (e.g., reads, writes, deletions, etc.) in non-volatile memory 104, etc.

In some embodiments, in addition to the other memory controller operations, processing unit 200 performs operations for controlling durations for which data is stored in non-volatile memory 104. In these embodiments, processing unit 200 determines, for data to be written to non-volatile memory 104, types of the data. For example, processing unit 200 can determine types of data by examining the data itself, metadata associated with the data, external values or indicators relating to the data, etc. In some embodiments, processing unit 200 uses one or more pattern matching templates, reference tables, algorithms, historical/past data type records, communication session data type identifiers, and/or other mechanisms for determining a type of the data.

Processing unit 200 also determines, based on the types of data, durations for which the data is to be stored in non-volatile memory 104. In other words, processing unit 200 selects, for each instance of data (e.g., single bit of data, 64 or 128 B block of data, 4 kB page of data or a portion thereof, 4 MB region of data, etc.), a duration from among multiple candidate durations for which the instance of data is to remain reliably stored in non-volatile memory 104. In some embodiments, the multiple candidate durations include two, four, or another number of durations, each duration being an amount of time or a range of time for which data is to be reliably stored in non-volatile memory 104. For example, in some embodiments, the candidate durations include a shorter duration (e.g., X seconds or minutes), one or more intermediate durations (e.g., K minutes or hours, H hours or days, etc.) and a longer duration (e.g., P days or years). In some embodiments, processing unit 200 acquires durations from type-duration table 204, which is a functional block that includes a number of entries, each entry including an identification of a duration for each type of data—and possibly other values or conditions associated with the durations and the use thereof, such as operating conditions, non-volatile memory state, application programs being executed, memory bandwidth being used, etc. In some embodiments, processing unit 200 computes the durations based on the types of the data using one or more type-duration algorithms. In some embodiments, processing unit 200 receives an indication of durations associated with data types from an external source such as processor 102, an operating system, etc.—and may dynamically update the type-duration table or the type-duration algorithms based on received indications.

Processing unit 200 also sets values of one or more parameters for writing the data based on the duration. For example, in some embodiments, when processing unit 200 determines that a shorter duration is to be used for a given instance of data, processing unit 200 sets the values of the one or more parameters to corresponding reduced values. For instance, assuming that the memory circuits in non-volatile memory 104 are flash memory circuits, processing unit 200 sets a write voltage, write current, and/or a write time to lower values from among a range of possible values for these parameters. In some embodiments, processing unit 200 uses a table, a historical record, an indication received from an external entity (e.g., processor 102, an operating system, etc.), an algorithm, and/or other source that maps parameter values to durations to determine the values for the one or more parameters—and possibly other values or conditions associated with the parameters and the use thereof, such as operating conditions, non-volatile memory state or conditions, software being executed, memory bandwidth being used, etc. In "setting" the values of the parameters, in some embodiments, processing unit 200 determines the values and then communicates the values for the parameters to non-volatile memory 104 to be used by non-volatile memory 104 when performing the writes for writing the data into the memory circuits—thereby setting non-volatile memory 104 to use the values for the parameters.

Processing unit 200 additionally causes the data to be written to non-volatile memory 104 using the values for the parameters. For example, in some embodiments, processing unit 200 communicates a request or other signal to non-volatile memory 104 that causes non-volatile memory 104 to perform the write for the data.

In some embodiments, refresh unit 202, in combination with processing unit 200, keeps track of data stored in non-volatile memory 104 and refreshes data in order to avoid any data stored in non-volatile memory 104 degrading or decaying to an unreliable state. The tracking and refreshing help to avoid the case in which a given instance of data is stored in the non-volatile memory with a particular duration (e.g., a shorter duration, an intermediate duration, etc.), but is retained in the non-volatile memory 104—and may still be used—after the particular duration has passed. In such a case, without refreshing, the given instance of data could degrade or decay into an unreliable state, which may mean losing the only current and correct copy of the given instance of data. For keeping track of the data, after writing a given instance of data to non-volatile memory 104, processing unit 200 sets an expected lifetime value in a record of expected lifetime associated with the given instance of data. Unless the given instance of data is removed from non-volatile memory 104, the expected lifetime value for the given instance of data grows shorter and eventually reaches zero relative to a current time. After processing unit 200 sets the expected lifetime value, refresh unit 202 checks the record of expected lifetime at one or more subsequent times to determine a remainder of the expected lifetime value for the data in the non-volatile memory. For example, refresh unit 202 may check the record of expected lifetime periodically, at one or more specified times, following particular events, etc. When the remainder of the expected lifetime is less than a threshold amount of time and the given instance of data remains stored in non-volatile memory 104, refresh unit 202 causes the data to be refreshed in non-volatile memory 104. For example, in some embodiments, assuming an original expected lifetime value of M minutes, refresh unit 202 checks every S seconds until determining that the remainder of the expected lifetime value is less than T seconds and then refreshes the given instance of data in non-volatile memory 104. Refreshing the data involves refresh unit 202 causing processing unit 200 to rewrite or otherwise reset or re-establish the given instance of data in non-volatile memory 104. For example, processing unit 200 may read the data out of a location in non-volatile memory 104 and write the data back to the location in non-volatile memory 104 or cause in-place refreshing circuit elements to refresh the data in the location in non-volatile memory 104.

In some embodiments, refresh unit 202 interacts with one or more other entities in electronic device 100 to perform the refresh. For example, in some embodiments, refresh unit 202 sends an interrupt to a core (e.g., core 108) and/or to software entities executed by the core (e.g., application programs, operating systems, etc.) to cause the core and/or software entities to refresh the data in non-volatile memory 104. In some of these embodiments, the refresh operation involves the other entity moving/migrating the data within non-volatile memory 104. For example, in some embodiments, non-volatile memory 104 includes at least two types of memory circuits (e.g., flash memory circuits and phase change memory circuits, etc.), with each type of non-volatile memory circuits having different degradation or decay profiles and thus different lifetimes for data stored therein, and refreshing the data can include the other entity migrating/moving the data from one type of memory circuits in non-volatile memory 104 to another type of memory circuits.

In some embodiments, expected lifetime table 206 is used for storing the records of expected lifetime for data stored in non-volatile memory 104. In these embodiments, upon writing a given instance of data into non-volatile memory 104, processing unit 200 sets a record of expected lifetime associated with the given instance of data in expected lifetime table 206 to reflect an expected lifetime of the data. Expected lifetime table 206 is a functional block that includes a number of entries, each entry including an identification of an expected lifetime for a respective instance of data stored in non-volatile memory 104—and possibly metadata associated with the expected lifetime. In some embodiments, expected lifetime table 206 is directly mapped and thus includes a dedicated entry for each location in which an instance of data can be stored in non-volatile memory 104. In some embodiments, expected lifetime table 206 includes less entries than the available locations in non-volatile memory 104 (and possibly far less entries) and thus entries in expected lifetime table are dynamically allocated (and may be re-allocated) for use in holding expected lifetime values for data that is presently stored in locations in non-volatile memory 104.

In some embodiments, metadata in non-volatile memory 104 (not shown) is used for storing the records of expected lifetime for data stored in non-volatile memory 104. In these embodiments, upon writing a given instance of data into non-volatile memory 104, processing unit 200 sets metadata (e.g., one or more bits) in a location in non-volatile memory 104 in which the given instance of data is stored or metadata associated with the location where the given instance of data is stored elsewhere in non-volatile memory 104 (e.g., in a dedicated metadata portion of non-volatile memory 104) to reflect an expected lifetime of the data. In some embodiments, the above-described metadata is more strongly stored in non-volatile memory 104 in order to ensure that the metadata is reliably stored in non-volatile memory 104 for as long as or longer than the corresponding data. For example, in some embodiments, the metadata is more strongly stored in the memory circuits in non-volatile memory 104—and possibly with a maximum duration in non-volatile memory 104. As another example, in some embodiments, the memory circuits for storing metadata are implemented in types of non-volatile memory with longer durations of storage—and possibly much longer than the durations of the memory circuits in which data is stored in non-volatile memory 104.

In some embodiments, the records of expected lifetime for data stored in non-volatile memory 104 are associated with regions of non-volatile memory 104. For example, assuming that non-volatile memory 104 includes a number of locations (e.g., 64 or 128 B, 4 kB, etc.) into which separate instances of data can be stored, a region can be defined as two or more of the locations. In some of these embodiments, the records of expected lifetime are set and reset to lower of an existing expected lifetime value for data already stored in the region (if any data is stored therein) or an expected lifetime value for a new instance of data being stored in the region.

In some embodiments, regions in non-volatile memory 104 (which may be different regions than the above-described regions used for keeping track of expected lifetime values) are associated with a respective duration (e.g., a shorter duration, an intermediate duration, a longer duration, etc.) and processing unit 200 selects a region into which an instance of data is to be stored in non-volatile memory 104 based on the duration for the instance of data. In other words, in these embodiments, processing unit 200 stores instances data in a given region in non-volatile memory 104 with other instances of data that have the same duration.

In some embodiments, when refreshing the data as described above, refresh unit 202 and/or processing unit 200 selects and uses a refresh duration for the data. In these embodiments, upon determining that the remainder of the expected lifetime for a given instance of data is less than a threshold amount of time and the given instance of data remains stored in non-volatile memory 104, before refreshing the data in non-volatile memory 104, refresh unit 202 and/or processing unit 200 determines, based on a type of the given instance of data and/or other factors, a duration for which the given instance of data is to be stored in non-volatile memory 104 following the refresh. In some embodiments, the refresh duration is a longer duration than an initial duration selected for the given instance of data—because the given instance of data has already remained in non-volatile memory 104 for longer than the initial duration. Processing unit 200 then uses the refresh duration for setting values for one or more parameters for refreshing the data and refreshes the data using the values for the one or more parameters. In some embodiments, the refresh duration is a default/fixed duration, although other embodiments dynamically select the refresh duration.

In some embodiments, communication paths are coupled between the various functional blocks in electronic device 100 (processor 102, non-volatile memory 104, etc.), as shown by arrow-headed lines between the elements. Communication paths include one or more buses, wires, guides, and/or other connections possibly along with controllers, fabric elements (switches, routers, etc.), circuit elements, etc. The communication paths are used to route commands, data, control signals, and/or other information between the functional blocks. Note that some communication paths in electronic device 100 are not shown in FIG. 1 for clarity.

Electronic device 100 and memory controller 106 are shown using particular numbers and arrangements of elements (e.g., functional blocks and devices such as processor 102, non-volatile memory 104, etc.) and communication paths. Electronic device 100, however, is simplified for illustrative purposes, in some embodiments, a different number or arrangement of elements and/or communication paths is present in electronic device 100. For example, electronic device 100 can include power subsystems, displays, etc. Generally, electronic device 100 includes sufficient elements and communication paths to perform the operations herein described.

Although memory controller 106 is shown as including particular functional blocks, in some embodiments, different arrangements of functional blocks are present in memory controller 106. For example, in some embodiments, processing unit 200 and refresh unit 202 are combined into a single functional block that performs the operations ascribed to both processing unit 200 and refresh unit 202. In addition, although memory controller 106 is described as performing certain operations, in some embodiments, a different functional block (e.g., a core 108 and/or 110 or a portion thereof, etc.) in electronic device 100 performs some or all of the operations.

Electronic device 100 can be, or can be included in, any electronic device that performs computational or other operations. For example, electronic device 100 can be, or can be included in, electronic devices such as desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof.

Processes for Writing and Refreshing Data in a Non-Volatile Memory

Figure 3:
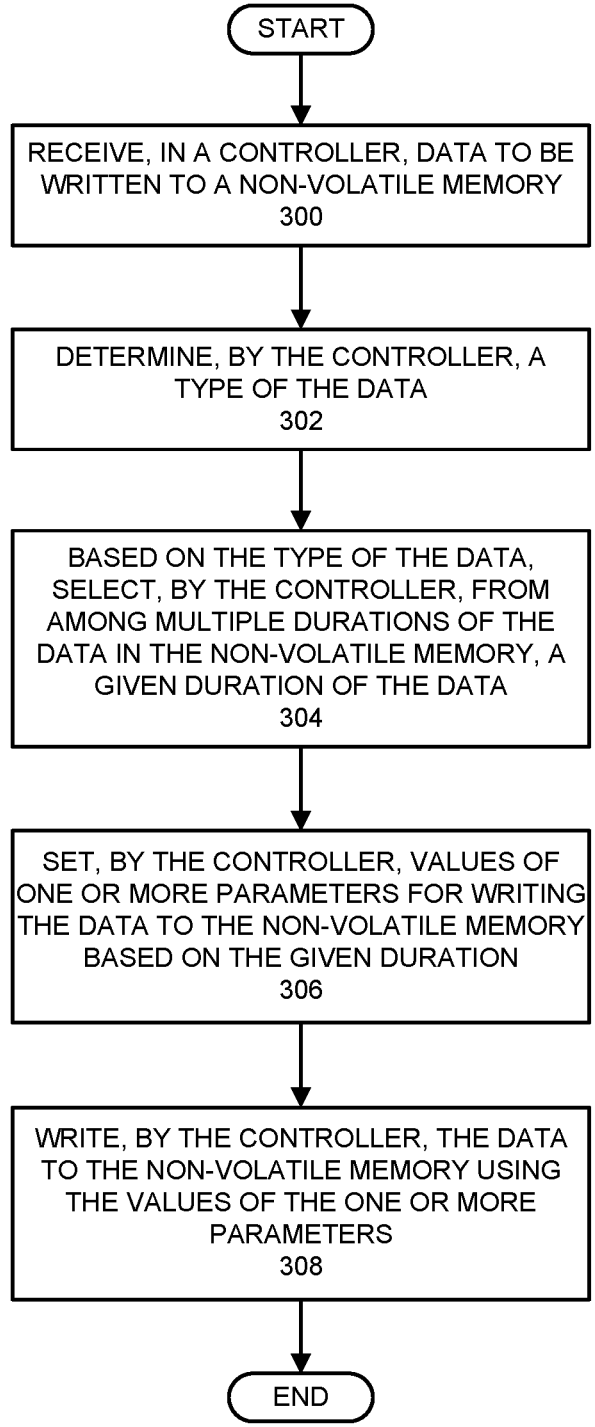
FIG. 3 presents a flowchart illustrating a process for writing data in a non-volatile memory in accordance with some embodiments.
Figure 4:
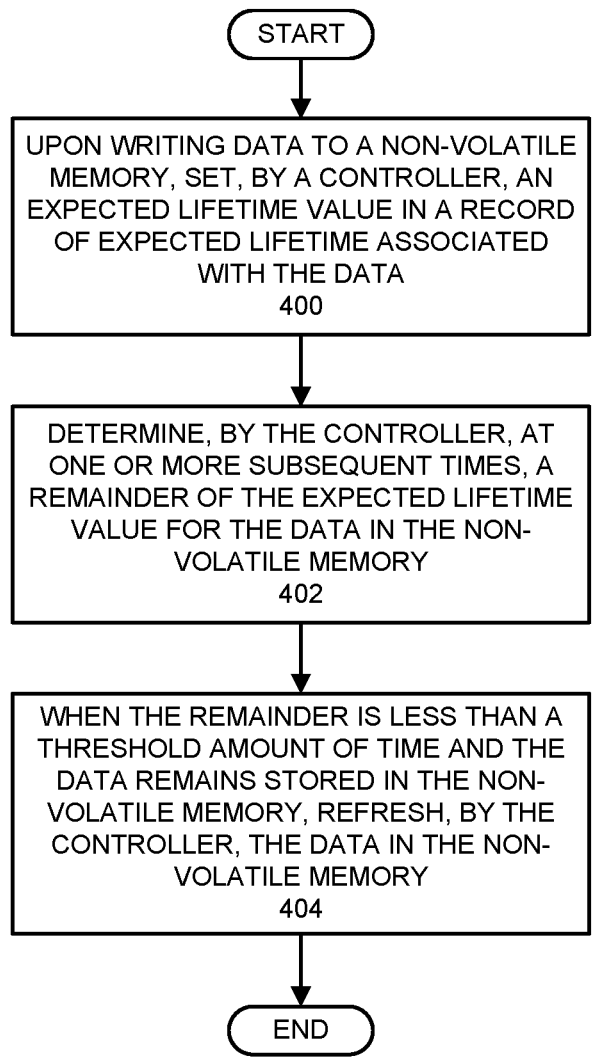
FIG. 4 presents a flowchart illustrating a process for refreshing data in a non-volatile memory in accordance with some embodiments.

In the described embodiments, a controller uses a type of data for determining a duration for which the data is to be stored in a non-volatile memory. In other words, the controller determines, based on the type of the data, an amount of time or a lifetime for which the data is to be reliably stored in the non-volatile memory. The controller then sets values for one or more write parameters for writing the data to the non-volatile memory based on the duration. The controller next uses the values for the one or more write parameters to perform a write for storing the data in the non-volatile memory. The controller subsequently refreshes the data in the non-volatile memory if the data approaches the end of the duration/lifetime in the non-volatile memory. FIGS. 3-4 present flowcharts illustrating processes for writing data in a non-volatile memory and refreshing the data in the non-volatile memory, respectively, in accordance with some embodiments.

For the examples in FIGS. 3-4, the non-volatile memory is assumed to be a flash memory and thus the controller performs operations for writing and refreshing data in a flash memory. The described embodiments are not, however, limited to flash memory and may use any form or combination of forms of non-volatile memory for which durations of written data can be controlled as described herein. For example, in some embodiments, the non-volatile memory is or includes one or more of phase change memory, ferroelectric random access memory, spin-transfer torque random access memory, and magnetoresistive random access memory.

FIG. 3 presents a flowchart illustrating a process for writing data in a non-volatile memory in accordance with some embodiments. Note that the operations shown in FIG. 3 are presented as a general example of operations performed by some embodiments. The operations performed by other embodiments include different operations, operations that are performed in a different order, and/or operations that are performed by different entities or functional blocks.

The process in FIG. 3 starts when a controller (e.g., memory controller 106) receives data to be written to a non-volatile memory (e.g., non-volatile memory 104) (step 200). For this operation, the controller receives, from another functional block or entity in the electronic device, a request to write a given block or portion of data to the non-volatile memory. For example, the controller may receive, from a memory management unit (e.g., MMU 112) in a processor (e.g., processor 102) a write request that includes data (e.g., a block of data such as a 64 byte block of data, a 4 kB page of data, etc.) or a reference thereto to be written to the non-volatile memory. In some embodiments, the request is included in a packet that contains information and/or metadata such as a source of the request, etc., as well as possibly containing the data or a portion thereof.

The controller then determines a type of the data (step 302). For this operation, the controller determines that the data is a given type from among multiple types of data in use in the electronic device. For example, in some embodiments, the controller determines whether the data is a shorter-lifetime types of data such as temporary data, data having limited contextual scope, operational variables, etc., or is a longer-lifetime types of data such as program code, user or system files, global values or variables, etc.

When determining the type of the data, the controller uses the data itself or information from another source, such as metadata associated with the data, information stored in the controller, information received from another entity in the electronic device, etc. For example, in some embodiments, the controller determines, based on contents of the data, an arrangement or pattern of the data, a size of the data, and/or other characteristics or properties of the data, the type of the data. As another example, in some embodiments, the controller reads information from a header of a packet in which the data is included (or of an earlier packet in a sequence of which the packet is a part) such as a source of the data, a destination address of the data, a communication session identifier, etc., and then determines the type of the data based thereon. As yet another example, in some embodiments, the controller maintains information about the requesting entity such as communication session information, a source-destination table, a priority record, etc. that the controller reads or otherwise uses to determine the type of the data. As yet another example, in some embodiments, the controller separately receives a data type indication associated with the data (e.g., via a sideband, a separate message, etc.) and determines the type based on the data type indication. Generally, in the described embodiments, any source of information that identifies the type of the data can be used for determining the type of the data.

In some embodiments, the memory circuits in the non-volatile memory support only a limited number of durations (e.g., two, three, etc.) and thus the number of types of data are limited by the number of durations. For example, in some embodiments, the memory circuits support only two durations (e.g., a shorter duration and a longer duration) and therefore the controller can use only two types of data. In some embodiments, however, the memory circuits in the non-volatile memory support numerous durations (e.g., ten, fifteen, etc.), the types of data are dictated by the types of data in use in the electronic device and/or other factors such as operating conditions, application programs being executed, etc.

The controller next selects, based on the type of the data, from among multiple durations of the data in the non-volatile memory, a given duration of the data (step 304). For this operation, the controller determines a duration (i.e., an amount of time, a lifetime, etc.) for which the data is expected to be useful and thus a duration for which the data is to be retained and available in the non-volatile memory. As used here, "retained and available" means that the data should remain stored in the non-volatile memory and should be reliable, i.e., hold a stored value of the data strongly enough that the stored value of the data can be accurately read from the non-volatile memory via a typical read operation.

In the described embodiments, the multiple durations include at least two candidate durations. The number and amounts of time of the candidate durations is dictated at least in part by the memory circuits used in the non-volatile memory and the write parameters that can and/or will be used by the controller. For example, in some embodiments, there are only two candidate durations—a shorter duration and a longer duration. In these embodiments, the longer duration may be associated with longer-lifetime types of data that are to be retained in the memory for longer amounts of time. In some of these embodiments, the longer duration is a typical, maximum, and/or default duration for the memory circuits in the non-volatile memory, although other longer durations may be used. The shorter duration, on the other hand, may be associated with shorter-lifetime types of data that are more ephemeral in nature and thus are only expected to be useful for shorter times. The timing of the shorter duration depends on the memory circuits and the write parameters that are/can be used. In some embodiments, the shorter duration is a shortest time for which stored data can be reliably written and stored in the non-volatile memory, although other amounts of time may be used for the shorter duration. As one example, in some embodiments, for flash memory, the shorter duration is on the order of minutes, versus years or decades for the longer duration.

In some embodiments, the controller uses other information along with the type of the data for determining the duration from among the multiple durations. For example, in some embodiments, the other information includes indicators of or identifiers for operating conditions, memory system bandwidth consumption, memory fullness, values of prior durations for data, etc. As another example, in some embodiments, the other information includes hints from other software or hardware entities in the electronic device. For instance, an application program or operating system may request that the controller use specified durations for some or all of the types of data. In this case, the durations specified by the application program or operating system can be different than durations that would otherwise be determined by the controller without the request.

In some embodiments, the controller uses a type-duration record or algorithm for determining the duration for a given instance of a type of data. For example, in some embodiments, the controller performs a lookup in a type-duration table (e.g., type-duration table 204) using the type of the data and possibly other information to determine the duration. As another example, in some embodiments, the controller computes the duration using a type-duration algorithm such as a mathematical expression for which an input is an identifier of the type of data (e.g., a numerical value that represents the type of data).

In some embodiments, the controller and/or another entity dynamically updates values in the type-duration record or algorithm. For example, the controller and/or the other entity can update the type-duration record or algorithm based on actual durations measured or detected for types of data in the non-volatile memory, based on operating conditions, based on a number of refresh operations being performed, and/or for other reasons. In these embodiments, dynamically updating the type-duration record or algorithm enables the controller and/or the other entity to have control over durations for which types of data are stored in the non-volatile memory.

The controller then sets the values of one or more parameters for writing the data to the non-volatile memory based on the given duration (step 306). For this operation, the controller first determines the values of the one or more parameters based on the duration, such as using a record (e.g., a table, list, or other record), an algorithm or expression, etc. to find values for parameters such as voltages, times, currents, clock frequencies, pulse durations or polarities, temperatures, etc. For example, the record, algorithm or expression, etc., may be set or provided to the controller when the controller is manufactured and possibly updated/reset during operation of electronic device (e.g., based on wear of the non-volatile memory, an operating state of the non-volatile memory, etc.). As another example, the record, algorithm or expression, etc. may be provided subsequent to manufacture, such as via a configuration file or firmware update, etc., and may be updated or replaced during operation of the electronic device.

When setting the values of the parameters, the controller sets one or more switches, bias and/or control values, circuit elements (e.g., semiconductor logic gates, configurable discrete elements, etc.), control registers, etc. so that circuit elements in write functional blocks (e.g., write drivers or amplifiers in the non-volatile memory, etc.) use the values of the one or more parameters when writing the data to the non-volatile memory. For example, in some embodiments, the controller directly or indirectly sets a control gate voltage, a write current, and/or a write time for memory circuits in a flash memory into which the data is to be written. In some embodiments, this operation includes the controller communicating with the non-volatile memory in order to instruct the non-volatile memory to use the values of the parameters for writing the data.

Although not shown in FIG. 3, in some embodiments the controller selects a region in the non-volatile memory into which the data is to be written based on the duration. In these embodiments, the non-volatile memory is logically or physically divided into two or more regions (e.g., 1 MB, 5 MB, etc.), each region being associated with at least one duration—and at least two regions being associated with different durations or combinations thereof. In these embodiments, upon determining the duration, the controller identifies a region that has a matching duration and causes the data to be written into the region. For example, the controller can request the non-volatile memory to write the data into the identified region, etc.

The controller then writes the data to the non-volatile memory using the values of the one or more parameters (step 308). For this operation, the controller communicates a request to write the data to the non-volatile memory. As described above, in some embodiments, the request includes an indication of the values of the one or more parameters and/or the region into which the data is to be written. Based on the particular values of the one or more parameters that are used for writing the data into the non-volatile memory, the data has an expected duration or lifetime in the non-volatile memory. For example, in embodiments where the non-volatile memory is a flash memory, data can be written to memory circuits using specified control voltages, write currents, and/or write times and thus have corresponding durations or lifetimes.

FIG. 4 presents a flowchart illustrating a process for refreshing data in a non-volatile memory in accordance with some embodiments. Note that the operations shown in FIG. 4 are presented as a general example of operations performed by some embodiments. The operations performed by other embodiments include different operations, operations that are performed in a different order, and/or operations that are performed by different entities or functional blocks.

The operations in FIG. 4 are performed after data is written to a non-volatile memory, such as after data is written to a non-volatile memory via the operations shown in FIG. 3. In the embodiments shown in FIG. 4, therefore, the data has an expected duration or lifetime in the non-volatile memory.

The process in FIG. 4 starts when a controller (e.g., memory controller 106), upon writing data to a non-volatile memory (e.g., non-volatile memory 104), sets an expected lifetime value in a record of expected lifetime associated with the data (step 400). For this operation, the controller, based on the previously selected duration for the data (e.g., selected in operation 304), sets the expected lifetime value in the record of expected lifetime. Generally, the record of expected lifetime is a record in which the controller keeps expected lifetime values for one or more locations into which data is stored in the non-volatile memory. For example, in some embodiments, the record of expected lifetime is or includes an expected lifetime table (e.g., expected lifetime table 206) and step 400 involves updating an entry in the expected lifetime table to include an identifier (e.g., one or more bits, numerical values, etc.) of the duration for the data in the non-volatile memory. For instance, the controller may update an entry in the expected lifetime table that is permanently or temporarily (e.g., via dynamic allocation) associated with a location in the non-volatile memory where the data is stored. As another example, in some embodiments, the record of expected lifetime is or includes metadata associated with the data in the non-volatile memory and step 400 involves updating the metadata to include an identifier (e.g., one or more bits, numerical values, etc.) of the duration for the data in the non-volatile memory. In these embodiments, the metadata can be stored in a number of locations in the non-volatile memory, such as in dedicated metadata bits at or near a location where the data is stored, in a separate metadata table or list in the non-volatile memory, etc.

In some embodiments, entries in the above-described expected lifetime table are associated regions or blocks in the non-volatile memory. In these embodiments, each entry in the expected lifetime table is associated with regions or blocks of at least two locations or addresses in the non-volatile memory where data can be stored. Each entry is used for storing a single, lowest current expected lifetime value for the data stored in the region. When setting the expected lifetime value in the expected lifetime table in these embodiments, the controller updates an expected lifetime value in an entry in an expected lifetime table associated with a region in the non-volatile memory in which the data is stored to an expected lifetime for the data when the expected lifetime of the data is lower than expected lifetimes for any other existing data in the region in the non-volatile memory—and otherwise leaves the entry in the expected lifetime table unchanged. The entries in the expected lifetime table therefore hold a single lowest expected lifetime value of all of the different instances of data stored in the corresponding region. In some of these embodiments, the refresh operation described below can be performed at the resolution of a region of memory. In other words, in these embodiments, when the entry in the expected lifetime table for a region indicates that the remainder of the expected lifetime value is below a threshold value, the controller refreshes all the data presently stored in the region.

In the described embodiments, the expected lifetime value can be any value that enables the controller to determine the remaining reliable lifetime of the data stored in the non-volatile memory (i.e., the remaining time until reads of the data are not certain of returning the originally stored data). For example, in some embodiments, a relative or absolute time for the duration (e.g., a future time at which the data becomes unreliable) is recorded as the expected lifetime value when the data is written into the non-volatile memory. As another example, in some embodiments, time is divided into epochs (or other portions), each epoch being of a specified amount of time, and the epoch in which the data is written into the non-volatile memory is recorded as the expected lifetime value.

The controller then determines, at one or more subsequent times, a remainder of the expected lifetime value for the data in the non-volatile memory (step 402). For this operation, the one or more subsequent times include some or all of a specified time after the data is written (e.g., K seconds, at a particular time, etc.), periodically, when a given event occurs, upon receiving a request from another hardware or software entity, and/or at another time. For example, the controller may check the remainder of the expected lifetime value for the data—and possibly for other or all data stored in the non-volatile memory—every M seconds.

How the controller determines the remainder of the expected lifetime value depends on how the expected lifetime value is stored in the record of expected lifetime. For example, in some embodiments where the expected lifetime value is a relative or absolute time for the duration of the data, the controller subtracts the recorded expected lifetime value from a current time (or vice versa) in order to determine the remainder of the expected lifetime value. As another example, in some embodiments where the expected lifetime value is an epoch in which the data was written into the non-volatile memory, the controller subtracts a running record of the epochs from the recorded epoch for the data (or vice versa) and uses the difference for determining the remainder of the expected lifetime.

When the remainder is less than a threshold amount of time and the data remains stored in the non-volatile memory, the controller refreshes the data in the non-volatile memory (step 404). For this operation, the controller performs the refresh operation in order to avoid the data reaching an age/amount of time stored in the non-volatile memory at which the data becomes unreliable. This operation is therefore performed to ensure that, when data remains in the non-volatile memory beyond the expected duration, the data remains safe to use. For example, in embodiments in which the data can have either a shorter duration or a longer duration, when the data was expected (i.e., assumed, predicted, etc.) to have the shorter duration, but remains stored in the non-volatile memory for longer than the shorter duration, the controller can refresh the data to keep the data reliable.

The operations performed for refreshing the data depend on the data and the functional blocks and memory circuits in the non-volatile memory. Generally, refreshing the data involves recharging, resetting, or otherwise bolstering the data as stored in the memory circuits. For example, in some embodiments, the memory circuits include self-refreshing circuit elements (e.g., pull-up or pull-down transistors or discrete elements, etc.) that are used to perform refreshes. As another example, in some embodiments, refreshing the data involves reading the data out of memory circuits where the data is stored and then rewriting the data back to the memory circuits. For instance, the data may be read from the memory circuits into a local/internal row buffer, memory element, or set of registers or latches and then rewritten into the memory circuits therefrom in order to avoid reading the data entirely off of the non-volatile memory and writing the data back onto the non-volatile memory.

In some embodiments, refreshing the data includes resetting the expected lifetime value in the record of expected lifetime values associated with the data. In these embodiments, steps 402-404 can be repeatedly performed for the data in the non-volatile memory, so that the controller monitors and occasionally refreshes the data in the non-volatile memory until the data is no longer present in the non-volatile memory (e.g., has been deleted, etc.).

In some embodiments, the controller uses a different duration than a prior duration for the data when refreshing the data in the non-volatile memory. For example, when refreshing an instance of data that was previously more weakly written to the non-volatile memory, the controller may use a longer duration or a default duration—and thus more strongly write an instance of data to the non-volatile memory. In these embodiments, the controller may use a refresh type-duration record or algorithm to determine the refresh duration. Similarly to the original write of the data, using the refresh duration involves setting values for one or more parameters for writing the data based on the refresh duration and then using the values of the one or more parameters for refreshing the data in the non-volatile memory (e.g., for rewriting the data in the non-volatile memory, etc.).

Although read operations are not shown in FIGS. 3-4, read operations in some embodiments are similar to those performed in existing electronic devices. This is true because the refresh operation shown in FIG. 4 ensures that the data in the non-volatile memory is kept relatively fresh and available for read accesses. In some embodiments, however, a check is performed before a given instance of data is read to ensure that the remainder of the expected lifetime value is sufficiently long to enable the read to complete. In some embodiments, refreshes are atomic, in that reads are not permitted until pending refreshes have completed.

In some embodiments, at least one electronic device (e.g., electronic device 100) uses code and/or data stored on a non-transitory computer-readable storage medium to perform some or all of the operations herein described. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, neural network processors or accelerators, field-programmable gate arrays (FPGAs), compute units, embedded processors, graphics processors (GPUs)/graphics cores, pipelines, accelerated processing units (APUs), functional blocks, controllers, accelerators, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., electronic device 100 or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A memory controller, comprising:
   a type-duration table;
   an expected lifetime table; and
   a processing unit, the processing unit configured to:
   select, from the type-duration table, a duration for which data of a type of data is to be stored in a non-volatile memory;
   write the data to the non-volatile memory using values of one or more write parameters that are selected based on the duration; and
   set an expected lifetime value in a record for the data in the expected lifetime table to indicate an expected lifetime of the data in the non-volatile memory.

2. The memory controller of claim 1, wherein the memory controller further comprises:
   a refresh unit configured to:
   determine a remainder of the expected lifetime value for the data stored in the non-volatile memory based on the expected lifetime value for the data in the expected lifetime table; and
   when the remainder is less than a threshold and the data remains stored in the non-volatile memory, refresh the data in the non-volatile memory.

3. The memory controller of claim 2, wherein, when refreshing the data in the non-volatile memory, the refresh unit is configured to:
   select refresh values of the one or more write parameters based on a refresh duration of the data selected by the refresh unit for refreshing the data; and
   when refreshing the data, write the data to the non-volatile memory using the refresh values for the one or more write parameters.

4. The memory controller of claim 1, wherein, when setting the expected lifetime value, the controller is configured to:
   when the expected lifetime of the data is lower than expected lifetimes for other data stored in a region in the non-volatile memory in which the data is stored, set an expected lifetime value in a record in the expected lifetime table associated with the region in the non-volatile memory to the expected lifetime value for the data.

5. The memory controller of claim 1, wherein the controller is further configured to:
   select a given region of the non-volatile memory from among two or more regions in the non-volatile memory based on the values of the one or more parameters, each of the two or more regions being used for storing data using respective values of the one or more parameters; and
   write the data to the given region of the non-volatile memory using the values of the one or more write parameters.

6. The memory controller of claim 1, wherein the one or more parameters include at least one of:
   a write time;
   a write voltage; and
   a write current.

7. The memory controller of claim 1, wherein the processor is further configured to dynamically update the type-duration table.

8. The memory controller of claim 1, wherein the processor is further configured to:
   receive a hint regarding the duration for which the data is to be stored in a non-volatile memory; and
   select the duration from the type-duration table based on the hint.

9. The memory controller of claim 1, wherein the type-duration table stores a respective duration associated with each type of data among a plurality of types of data.

10. The memory controller of claim 1, wherein the expected lifetime table stores an expected lifetime value representing a respective amount of time for which each portion of data stored in the non-volatile memory is expected to remain reliably stored in the non-volatile memory.

11. A method for writing data to a non-volatile memory, the method comprising:
   selecting, from a type-duration table, a duration for which data of a type of data is to be stored in a non-volatile memory;
   writing the data to the non-volatile memory using values of one or more write parameters that are selected based on the duration; and
   setting an expected lifetime value in a record for the data in an expected lifetime table to indicate an expected lifetime of the data in the non-volatile memory.

12. The method of claim 11, further comprising:
determining a remainder of the expected lifetime value for the data stored in the non-volatile memory based on the expected lifetime value for the data in the expected lifetime table; and
when the remainder is less than a threshold and the data remains stored in the non-volatile memory, refreshing the data in the non-volatile memory.

13. The method of claim 12, wherein refreshing the data in the non-volatile memory comprises:
selecting refresh values of the one or more write parameters based on a refresh duration of the data selected by the refresh unit for refreshing the data; and
when refreshing the data, writing the data to the non-volatile memory using the refresh values for the one or more write parameters.

14. The method of claim 11, further comprising:
when the expected lifetime of the data is lower than expected lifetimes for other data stored in a region in the non-volatile memory in which the data is stored, setting an expected lifetime value in a record in the expected lifetime table associated with the region in the non-volatile memory to the expected lifetime value for the data.

15. The method of claim 11, wherein writing the data to the non-volatile memory comprises:
selecting a given region of the non-volatile memory from among two or more regions in the non-volatile memory based on the values of the one or more parameters, each of the two or more regions being used for storing data using respective values of the one or more parameters; and
writing the data to the given region of the non-volatile memory using the values of the one or more write parameters.

16. The method of claim 11, wherein the one or more parameters include at least one of:
a write time;
a write voltage; and
a write current.

17. The method of claim 11, further comprising:
dynamically updating the type-duration table.

18. The method of claim 11, further comprising:
receiving a hint regarding the duration for which the data is to be stored in a non-volatile memory; and
selecting the duration from the type-duration table based on the hint.

19. The method of claim 11, wherein the type-duration table stores a respective duration associated with each type of data among a plurality of types of data.

20. The method of claim 11, wherein the expected lifetime table stores an expected lifetime value representing a respective amount of time for which each portion of data stored in the non-volatile memory is expected to remain reliably stored in the non-volatile memory.

* * * * *